Sept. 6, 1938.  C. M. NEVIUS  2,129,587
COFFEE BREWING DEVICE
Filed May 1, 1936
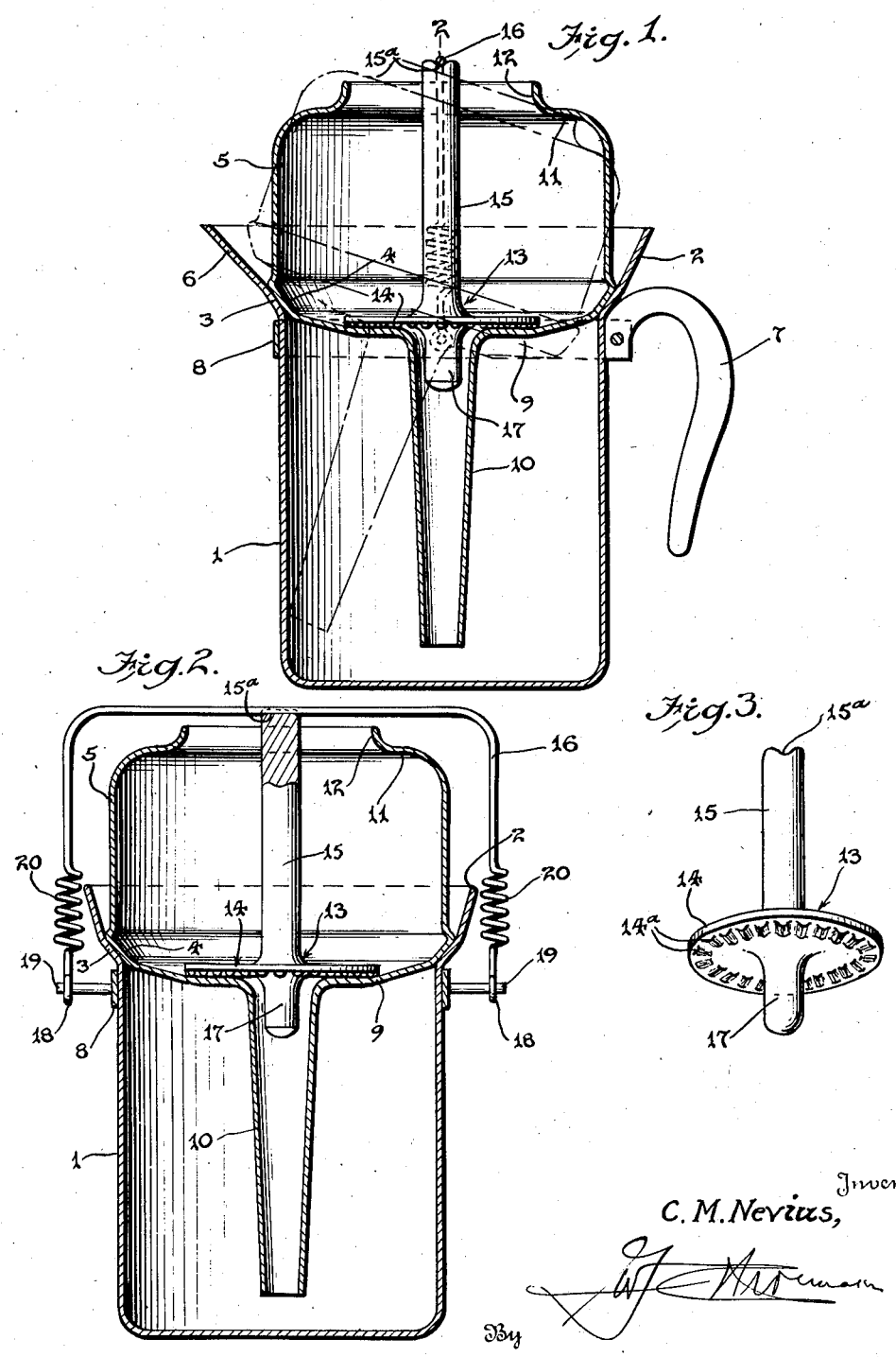
Inventor
C. M. Nevius, Patented Sept. 6, 1938

2,129,587

UNITED STATES PATENT OFFICE 2,129,587

COFFEE BREWING DEVICE

Condict M. Nevius, Hornell, N. Y.

Application May 1, 1936, Serial No. 77,444

23 Claims. (Cl. 53—3)

This invention relates to a coffee brewing device.

To operate brewing devices water is placed in the lower receptacle, and the upper receptacle, with the filter assembled, is placed in position so as to have a sealed connection with the top opening of the lower receptacle, there being a tube leading from the interior of the upper receptacle to the lower receptacle. Ground coffee is placed in the upper receptacle above the filter and heat is applied to the bottom of the lower receptacle until steam pressure is generated. The steam forces the boiling water up through the hollow tube into the upper receptacle where the brewing of the beverage is accomplished. Upon completion of the brewing further application of heat is stopped and immediately thereafter the steam contained in the lower receptacle condenses thereby creating a vacuum which draws the completed brew through the filter and tube back into the lower receptacle.

After the brewing of the coffee has been completed it has been necessary with coffee brewing devices of this type to remove the upper brewing receptacle from the lower receptacle in order to serve the coffee. There has been some reluctance on the part of users to adopt the present method of brewing coffee because of the necessity of removing the upper receptacle during the preparations of or the serving of a meal. Therefore, one of the primary objects of the present invention is to do away with the necessity of removing the upper brewing receptacle from the lower receptacle to permit pouring of the coffee from the lower receptacle.

Another object of the invention is to improve the construction of that type of coffee brewing devices comprising a lower receptacle for heating water constituting a coffee pot and having only one opening at the top and an upper coffee brewing receptacle seated within the opening in the top of the coffee pot or receptacle and provided with a hollow tube or neck extending from the bottom of the upper brewing receptacle nearly to the bottom of the lower receptacle or coffee pot.

A further object of the invention is to provide a coffee brewing device of this character equipped with an upper brewing receptacle adapted to have a sealed connection with the lower receptacle during the brewing operation; and capable, after the completion of the brewing operation and without removing it from the lower vessel, of being tilted, slid, rocked or otherwise shifted from its sealing position with relation to the lower receptacle so as to thereby provide a pouring passage to permit the coffee to be poured from the lower receptacle and provide a venting passage arranged to permit the entrance of air at a point spaced from the pouring passage to facilitate the pouring of the coffee from the lower receptacle.

Another object of the invention is to provide a coffee brewing device including upper and lower receptacles provided with cooperating sealing surfaces adapted to provide for an effective sealed connection between the receptacles during the brewing process, the sealing surfaces being of such a character as to obviate precision or exactness on the part of the user in placing the receptacles together and irrespective of slight inaccuracies or irregularities in the manufacture of the cooperating sealing surfaces, permitting of a slight inclination, within given limits, of the upper receptacle with relation to the lower receptacle without breaking the sealing connection between the receptacles until it is desired to break the sealing connection to permit pouring of the brewed coffee from the lower receptacle and which may be accomplished without separating the receptacles.

Another object of the invention is to provide the upper and lower receptacles with smooth, effectively engaged sealing surfaces so that when the receptacles are made of vitreous or other materials, the upper receptacle may have a rocking or sliding tilting movement without danger of scratching or chipping.

A further object of the invention is to provide fastening means for securing the upper receptacle on the lower receptacle adapted to maintain the sealing surfaces of the upper and lower receptacles in effective operative sealing contact and capable also of permitting the upper receptacle to be shifted from its operative sealing position without undue hindrance from the fastening means.

It is also an object of the invention to provide an improved filter adapted to afford the maximum area of openings for the passage of liquid and capable of excluding coffee particles of minimum size to prevent the same from either clogging the filter or passing from the upper receptacle into the lower receptacle, whereby the coffee used in the brewing device may be ground as fine as desired without affecting the operation of the filter or an effective brewing process.

With these and other objects in view, the invention consists in the construction and novel combination and arrangement of parts herein-after fully described, illustrated in the accompanying drawing and pointed out in the claims hereto appended, it being understood that various changes in the form, proportion and details of construction, within the scope of the claims, may be resorted to without departing from the spirit or sacrificing any of the advantages of the invention.

In the drawing:

Fig. 1 is a vertical sectional view of the coffee brewing device constructed in accordance with this invention, the upper brewing receptacle being shown in sealing position in full lines and in a tilted position in dot and dash lines.

Fig. 2 is a vertical sectional view on the line 2—2 of Fig. 1.

Fig. 3 is a detail perspective view of the filter.

In the accompanying drawing in which is illustrated one embodiment of the invention, for purposes of illustration, the details of construction being subject to modification, the coffee brewing device illustrated comprises in its construction a lower receptacle 1 having the form of a conventional coffee pot and provided at the top with a flared portion 2 and having immediately below the same an annular bearing surface 3 which may be a zone of a sphere, that is transversely slightly arcuate or transversely concavo-convex or exteriorly convex, constituting wholly or exteriorly a section of a sphere. This annular bearing surface 3 may be otherwise formed. For instance, it may be in the nature of a frustum of a cone or tapered to provide an effective sealing surface for coactive bearing relation with an annular cone-shaped, tapered or other bearing surface 4 of an upper brewing receptacle 5, to provide for an effective sealing connection between the receptacles.

The lower receptacle 1 is provided at the flared portion with a pouring lip 6 located at the front of the same and it is also provided at the back with a suitable handle 7. The pouring lip and handle may each be of any suitable character and the handle may be secured to the lower receptacle in any suitable manner and by any suitable means. As shown for purposes of illustration, the handle is secured to the lower receptacle by a band 8 extending around the lower receptacle.

The lower receptacle which constitutes a coffee pot may be either cylindrical, polygonal or other shape in cross section and embody well known or other paneled walls or be of any desired ornamental configuration below the bearing surface 4.

The upper brewing receptacle 5 is substantially cylindrical and provided with a dished, tapered or other form of bottom 9. A tube 10 depends from the bottom 9. As shown for purposes of illustration, the tube 10 is disposed centrally of the upper receptacle 5 and it is tapered downwardly and extends to near the bottom of the lower receptacle 1. This tube 10 may have a cross sectional shape other than tapered and it may be formed integral with or separately from the upper receptacle 5 and secured thereto in any suitable manner.

The brewing receptacle 5 is preferably provided with a tapered upper portion 11 forming a contracted mouth 12, but it may be of any other desired configuration. The bearing sealing surface 4 which is located at the juncture of the side walls and the bottom of the upper brewing receptacle is formed by an intermediate downwardly directed portion and is substantially transversely arcuate and is illustrated as constituting a section of a sphere similar to the bearing portion 3 of the lower receptacle or it may be tapered or convexed to provide a bearing surface particularly adapted to fit the substantially annular bearing surface of the lower receptacle to provide for effective coacting relation between the sealing surfaces 3 and 4.

When the brewing receptacle is arranged in a substantially upright position, the bearing surface 4 of the upper brewing receptacle and the bearing surface 3 of the lower receptacle provide an effective sealing connection at the contacting or bearing portions of the upper and lower receptacles during the brewing process. After the operation of brewing coffee has been completed, the upper brewing receptacle may be rocked, moved or slidably tilted or otherwise moved to the dot and dash line position illustrated in Fig. 1 of the drawing to provide a front pouring passage at the lip 6 and a vent passage at the back of the lower receptacle to permit the entrance of air to facilitate the flow of coffee from the lower receptacle.

The movement of the upper brewing receptacle as shown in dotted lines spaces the annular bearing surface 4 above the annular bearing surface 3 adjacent the spout 6 and at the same time carries the opposite side of the annular bearing surface 4 below the bearing surface 3 at the back of the lower receptacle to provide the said venting passage.

A filter is disposed between the tube 10 and the upper brewing receptacle 5. The filter may be of any suitable construction but the filter 13 is shown as comprising a substantially horizontal disk 14 and a central vertical stem 15 extending upwardly from the upper face of the disk through the opening at the top of the upper brewing receptacle and provided in its upper end with a notch 15ª arranged to be engaged by a bail 16 whereby the filter may be held in position within the brewing receptacle and the upper brewing receptacle maintained in sealing contact with the bearing surface of the lower receptacle.

The disk 14 is provided in its lower face with an annular series of ribs 14ª designed in practice to be a few thousandths of an inch in their vertical dimension and adapted when the filter is placed upon the bottom of the brewing receptacle 5 to provide an annular series of filtering openings of considerable length but very slight vertical dimension. By this means filtering openings are provided of a maximum area for the filtering operation and coffee particles of a minimum size will be excluded.

The filter is provided at the center of the lower face of the disk with a depending stem portion 17 of approximately the diameter of the upwardly extending stem and arranged to extend into the upper portion of the depending tube 10 to assist in positioning the filter and also to divide the liquid which flows upwardly around the depending stem portion. The depending stem portion 17 is arranged in spaced relation with the sides of the depending tube when the filter is in place. The filter may be provided with a filter cloth (not shown) which may be conveniently in the form of a bag with a draw-string for securing it on the filter.

The bail 16 is provided at the lower ends of its sides with eyes 18 through which extend studs 19 forming pivots for the bail and extending horizontally from the band 8 but any other suitable means may be employed for hinging or pivoting the bail to the lower receptacle. The sides of the bail are provided with coiled resilient portions 20 forming springs for yieldably maintaining the bail in engaging with the upper end of the stem of the filter to hold the filter in place and maintain the upper brewing receptacle in sealing contact with the lower receptacle and at the same time permit the upper brewing receptacle to be tilted to the position illustrated in dot and dash lines in Fig. 1 of the drawing. Instead of employing springs for enabling the bail to be engaged with and disengaged from the filter, any other suitable means may be provided for accomplishing this result.

The arcuate or other bearing and sealing surfaces 3 and 4 of the lower and upper receptacles permit of a rocking, movable or slidable, tiltable backward and forward movement of the upper receptacle in any direction to a limited extent without breaking the seal between the upper and lower receptacles at said bearing surfaces 3 and 4.

While the bearing surface 4 of the upper receptacle may be of any suitable form, it will be understood that it is preferably designed to be a section or zone of a true spherical bearing surface, always maintaining a sealing bearing surface on the annular bearing surface 3 to provide an effective sealing connection between the receptacles no matter what position the upper receptacle occupies with relation to the lower receptacle during the brewing process. For instance, when the brewing receptacle is nearly in an upright position, that is, slightly offset from the vertical, the bearing surface 4 will have a full circular sealing registry with a minimum circular line contact with the bearing surface 3 and, if lapped into place, it will have a maximum annular surface contact therewith, particularly if the bearing surface 3 of the lower receptacle is downwardly arcuate close to the same radius as the bearing surface 4 of the upper brewing receptacle.

When the upper or brewing receptacle is moved to break the sealed connection 3—4 between the receptacles to provide the aforesaid pouring and ventilating passages, the bearing surface 4 of the upper receptacle maintains contact with the bearing surface 3 of the lower receptacle at opposite sides with lunate gaps at the front and rear. An even bearing with minimum friction is afforded to enable the relative position of the upper receptacle and the lower receptacle to be changed at will. In practice, the bearing surface 4 of the upper receptacle will be ground preferably to a true spherical or annular, arcuate surface, but the bearing surface of the lower receptacle may consist of an annular bearing surface of slightly greater radius than the spherical bearing shape of the surface of the upper receptacle. Also the annular, arcuate or spherical bearing surface of the upper receptacle will cooperate with and seal the lower receptacle when the latter is provided with a downwardly tapered conical or similarly shaped bearing surface. Such modifications of the invention result in low cost of manufacture and enable the tops and bottoms of complete brewing devices to be interchanged.

It will be understood that various parts of the brewing receptacle may be formed integral or separately and in any suitable manner connected or held together and also that various parts of both receptacles may be modified within the scope of the appended claims.

It is to be understood that I have no intention to limit myself to the specific type of brewing device illustrated and described but that I comprehend coverage of wide departures from the disclosure in the drawing accompanying the specification, insofar as the appended claims permit, and among characteristics involved in the illustrated structure is a combination of elements including upper and lower receptacles having a detachable or removable sealed connection during the brewing process so that subsequent to the brewing operation the coffee may be dispensed at a point between the receptacles by a relative movement of the receptacles and yet without such movement as to take the receptacles out of contactual relation with each other and whether this movement be a tilting, rocking, rotatable, sliding or other movement. These functions may be performed without disturbing the filtering means as regards its association with a particular part or parts of the device. The holding means for maintaining the upper and lower receptacles need not be detached at any time from the device. The result is that coffee may be brewed effectively and later dispensed without separating any of the parts with relation to one another and thereby overcoming the heretofore inconvenience to users of coffee brewing devices occasioned by necessity of removal of parts between the steps of brewing and pouring the coffee.

With the upper and lower receptacles in sealed relation, coffee grounds may be introduced into the upper brewing receptacle and hot water poured on the coffee grounds. This sealed relation may be maintained as long as desired. At the proper time, the sealed relation between the receptacles is broken and the resultant brew will enter the lower receptacle through the tubular communication enriched and strong in flavor as when the coffee is brewed as first described herein.

What is claimed is:

1. A coffee brewing device comprising a lower receptacle open at the top and having a downwardly tapering bearing surface and provided with a pouring lip, and an upper brewing receptacle seated upon the bearing surface of the lower receptacle and having a downwardly tapered surface for coaction with the said bearing surface of the lower receptacle when the upper receptacle is in a vertical or substantially vertical position to provide a sealed connection between the receptacles during the brewing process, said upper receptacle being movable relative to said lower receptacle to break said sealed connection to provide a pouring passage at the pouring lip between said bearing surfaces and a venting passage between said bearing surfaces at a point spaced from the pouring lip.

2. A coffee brewing device comprising a lower receptacle open at the top and provided thereat with a downwardly annular tapered arcuate bearing surface and having a pouring lip, an upper brewing receptacle provided with a downwardly tapered bearing surface for seating upon the bearing surface of the lower receptacle to form a sealed connection between said receptacles during the brewing process, said upper receptacle being tiltable to break said sealed connection at spaced points to provide pouring and vent spaces between the bearing surfaces of the upper and lower receptacles, and an open-ended tube depending from the bottom of the upper receptacle and extending into the lower receptacle and establishing communication between the upper and lower receptacles.

3. A coffee brewing device comprising a lower receptacle open at the top and provided thereat with a flaring portion having a pouring lip, said lower receptacle being also provided below the flaring portion with a downwardly tapered bearing surface, and an upper brewing receptacle provided at the bottom with a downwardly tapered exterior arcuate bearing surface seated normally upon the bearing surface of the lower receptacle to form a sealed connection between the receptacles when the upper brewing receptacle is in a vertical or substantially vertical position, said upper brewing receptacle being movable from a vertical or substantially vertical position to break the sealed connection between it and the lower receptacle and form a pouring passage adjacent the pouring lip and provide a vent passage substantially diametrically opposite the pouring passage.

4. A coffee brewing device including a lower receptacle open at the top and provided with a flaring bearing surface, an upper brewing receptacle having a tapered arcuate bearing surface coacting with the bearing surface of the lower receptacle to provide a sealed connection between the receptacles during the brewing process irrespective of different substantially vertical positions of the upper receptacle relative to the lower receptacle, a filter arranged within the upper brewing receptacle, and means connected with the lower receptacle and engageable with the filter for holding the filter in place and for maintaining the upper receptacle in different positions on the lower receptacle.

5. A coffee brewing device including a lower receptacle open at the top and provided with a flaring bearing surface, an upper brewing receptacle having a tapered arcuate bearing surface coacting with the bearing surface of the lower receptacle to provide a sealed connection between the receptacle during the brewing process, an open-ended tube depending from the bottom of the upper brewing receptacle and establishing communication between said receptacles, a filter arranged upon the bottom of the upper receptacle over said depending tube and provided with a stem extending above the upper receptacle, and means connected with the lower receptacle and engageable with the stem of the filter for holding the filter in place and for maintaining said bearing surfaces normally in contacting engagement.

6. A coffee brewing device including a lower receptacle open at the top and provided with an interior flaring bearing surface, an upper brewing receptacle having an exterior arcuate bearing surface coacting with and seated upon the interior bearing surface of the lower receptacle to provide a sealing connection between said receptacles during the brewing process, a filter arranged upon the bottom of the upper receptacle and having an upwardly extending stem, and a bail connected with the lower receptacle and engageable with the stem of the filter for holding the same in place and for maintaining said bearing surfaces normally in cooperative sealing relation.

7. A coffee brewing device including a lower receptacle, a brewing receptacle seated upon the lower receptacle, a filter arranged within the brewing receptacle and provided on its underside with spaced ribs resting upon the bottom of the brewing receptacle and forming intervening filtering openings for the passage of liquid between the filter and the bottom of said receptacle, and means connected with the lower receptacle for holding the ribs of the filter upon the bottom of the brewing receptacle.

8. A coffee brewing device including a lower receptacle, a brewing receptacle seated upon the lower receptacle, a filter arranged within the brewing receptacle and comprising a disk provided at its lower face with an annular series of spaced ribs arranged upon the bottom of the brewing receptacle and forming intervening filtering openings for the passage of liquid, and means connected with the lower receptacle for holding the ribs of the filter upon the bottom of the brewing receptacle.

9. A coffee brewing device including a lower receptacle open at the top, an upper brewing receptacle seated upon the lower receptacle at the open top thereof and provided with an open ended tube depending within the lower receptacle and establishing communication between said receptacles, a filter having a depending portion extending into the said tube, said filter being provided around the depending portion above the latter with spaced ribs resting upon the bottom of the upper brewing receptacle and forming intervening filtering openings for the passage of liquid between said receptacles, and means connected with the lower receptacle for holding the ribs of the filter upon the bottom of the upper brewing receptacle.

10. A coffee brewing device including a lower receptacle open at the top, an upper brewing receptacle seated upon the lower receptacle at the open top thereof and provided with an open ended tube depending within the lower receptacle and establishing communication between said receptacles, a filter arranged within the upper brewing receptacle and having a depending portion extending into the upper end of said tube and provided with spaced ribs arranged in a series surrounding the said depending portion above the latter, said filter resting upon the bottom of the upper brewing receptacle and said ribs forming intervening filter openings between the filter and the bottom of the upper receptacle, and an upwardly extending stem rising from the filter and having a notch at its upper end, and a bail connected with the lower receptacle and engageable with the notch of the stem for holding the filter on the bottom of the upper receptacle and for holding the upper receptacle normally in substantially vertical relation with the lower receptacle.

11. A coffee brewing device comprising a lower receptacle, an upper brewing receptacle, a filter arranged within the upper brewing receptacle, and a bail pivoted to the lower receptacle and engageable with the filter and provided at opposite sides with resilient portions for maintaining the bail in engagement with the filter for yieldably holding the filter and the upper receptacle normally in operative positions for brewing coffee and when serving the coffee.

12. A coffee brewing device including a lower receptacle open at the top, an upper brewing receptacle arranged upon the lower receptacle in the open top thereof and having an open ended tube depending within the lower receptacle to establish communication between said receptacles, a filter arranged within the upper receptacle over the upper end of said tube and provided with means for cooperation with the bottom of the upper receptacle to provide filtering openings communicating with the interior of the upper brewing receptacle and said tube, said filter being also provided with an upwardly extending stem, and fastening means connected with the lower receptacle and engageable with the stem of the filter for holding the latter in position and for maintaining the upper brewing receptacle on the lower receptacle.

13. A coffee brewing device comprising a lower receptacle having side walls, an interior annular bearing surface and a pouring lip immediately above said surface, and an upper brewing receptacle having communication with the lower receptacle and provided with an annular zone of a spherical bearing surface for sealing relation with the bearing surface of the side walls of the lower receptacle to provide a sealed connection between the receptacles at the side walls thereof and yet permit of a sliding movement of said bearing surface of the upper receptacle on the adjacent bearing surface of the lower receptacle into different tilted positions on the lower receptacle without breaking the mating relation between the receptacles at the side walls thereof whereby pouring from the lower receptacle may be accomplished with the upper receptacle in tilted position.

14. A coffee brewing device comprising a lower receptacle flared at its upper end and having an interior annular tapering bearing surface arranged substantially at the joint between the body of the lower receptacle and the flaring upper end thereof and also having a pouring lip formed in the flaring portion thereof above said bearing surface, and an upper brewing receptacle having an exterior substantially transversely arcuate shaped annular bearing surface for continuous coacting relation with the aforesaid annular bearing surface of the lower receptacle, providing for a continuous, breakable sealing joint connection between said receptacles at their said annular bearing surfaces, said bearing surfaces being of a width to permit the annular bearing surface of the upper receptacle to assume different lines of contact with the annunlar bearing surface of the lower receptacle without breaking the continuous sealing joint connection between said annular bearing surfaces upon slight tilting of the upper receptacle with relation to a vertical position of the lower receptacle, said receptacles having communication with each other, and a filtering means arranged in the line of said communication, the upper ceptacle being capable of movement with relation to the lower receptacle on said annular bearing surface of the latter to an extent to permit breaking the continuous annular coacting relation of said bearing surfaces to provide spaced passages, one passage at the pouring lip and the other passage providing a vent at a point spaced from the pouring lip whereby to permit pouring of the contents of the lower receptacle therefrom through said pouring lip.

15. A coffee brewing device comprising a lower receptacle having an outwardly flaring open upper end and a pouring lip formed in said flaring upper end and also having a continuous interior annular tapering surface arranged below said pouring lip, an upper brewing receptacle having communication with the lower receptacle and also having a continuous exterior annular bearing surface for coacting relation with said continuous bearing surface of the lower receptacle to provide a continuous annular sealed joint connection between said bearing surfaces below said pouring lip when said bearing surfaces are in continuous coacting relation, a filtering means between the upper receptacle and the said communication between said receptacles, said upper receptacle being tilted on said bearing surfaces to dispose the bearing surfaces at an angle with relation to each other to break the continuous sealing joint connection and provide a pouring passage between the receptacle at the pouring lip and also provide a vent passage whereby to permit pouring of the contents from the lower receptacle through the pouring lip.

16. A coffee brewing device comprising a lower receptacle having an interior annular tapering bearing surface and a pouring lip above said bearing surface, and an upper brewing receptacle having an exterior tapering annular bearing surface for coacting relation with said bearing surface of the lower receptacle, providing for a continuous, breakable sealing joint connection between said receptacles at their said annular bearing surfaces, said bearing surfaces being of a width to permit the annular bearing surface of the upper receptacle to assume different lines of contact with the annular bearing surface of the lower receptacle without breaking the continuous sealing joint connection between said annular bearing surfaces upon slight tilting of the upper receptacle with relation to a vertical position of the lower receptacle, a tube depending substantially centrally of and from the upper receptacle into the lower receptacle and establishing communication between said receptacles, a filtering device including a member having a lower flat face provided with spaced ribs on the under face thereof and said member being mounted on the bottom of the upper receptacle to provide passages between the bottom of the upper receptacle and said flat member to permit of flow of liquid between said receptacles through said tube, the upper receptacle being capable of tilting movement with relation to the lower receptacle on said annular bearing surface of the latter to an extent to permit breaking of said continuous annular coacting relation of said bearing surfaces to provide oppositely disposed spaced passages, one passage at the pouring lip and the opposite passage providing a vent whereby to permit pouring of the contents of the lower receptacle therefrom through said pouring lip, and yieldable means having connection with the lower receptacle and with said filtering means for holding the ribs of the filter upon the bottom of the upper receptacle and to maintain said bearing surfaces in continuous coacting sealing relation during the brewing process and also to maintain the filtering means in operative position against movement with relation to said upper receptacle and tube during the brewing process and against the action of which yieldable means said upper receptacle may be tilted to permit of said breaking of the continuous mating relation between said bearing surfaces when the upper receptacle is tilted without shifting of the filter means with relation to the upper receptacle.

17. A coffee brewing device comprising a lower receptacle having side walls and an open top and an interior annular bearing surface, and an upper brewing receptacle having communication with the lower receptacle and provided with an annular zone of a spherical bearing surface for coacting relation with the side walls of the lower receptacle to provide a sealed connection between the receptacles at the side walls thereof and yet permit of a sliding movement of said bearing surface of the upper receptacle on the bearing surface of the lower receptacle into different positions on the lower receptacle without breaking the coacting sealing relation between the receptacles at the side walls thereof, and a filtering means at the communication between the receptacles, said upper receptacle being tiltable to move said bearing surfaces out of coacting sealing relation to provide passages, one passage for pouring the contents out of the lower receptacle and the other passage providing a vent.

18. A coffee brewing device comprising a lower receptacle open at the top, an upper brewing receptacle, the receptacles having sealing contact surfaces disposed in sealing contact relation during the brewing process and at such time also having communication with each other, the steam pressure from the boiling water in the lower receptacle incident to the brewing process forcing the water upwardly into the upper brewing receptacle through said communication and upon condensation thereof forcing the fluid back through said communication into the lower receptacle by atmospheric pressure, said receptacles being movable at will relative to each other upon completion of the brewing process to break the sealed contact engagement thereof at opposite points and permit pouring of the brewed coffee from the top of the lower receptacle and while the sealing contact surfaces are in partial contact with each other, and a filtering means arranged in the line of said communication between the receptacles.

19. A coffee brewing device comprising a lower receptacle open at the top, an upper brewing receptacle, the receptacles having sealing contact surfaces disposed in sealing contact relation during the brewing process and at such time also having communication with each other, means for holding the receptacles in sealed relation during the brewing process, the steam pressure from the boiling water in the lower receptacle incident to the brewing process forcing the water upwardly into the upper brewing receptacle through said communication and upon condensation thereof forcing the fluid back through said communication into the lower receptacle by atmospheric pressure, said receptacles being movable at will relative to each other against the holding action of said holding means upon completion of the brewing process to break the sealed contact engagement thereof at opposite points and permit pouring of the brewed coffee from the top of the lower receptacle while the sealing contact surfaces are in partial contact with each other and without removing said holding means from the device, and a filtering means arranged in the line of said communication between the receptacles.

20. A coffee brewing device comprising a lower receptacle open at the top, an upper brewing receptacle, the receptacles having sealing contact surfaces disposed in sealing contact relation during the brewing process and at such time also having communication with each other, said receptacles being movable at will relative to each other upon completion of the brewing process to break the sealed contact engagement thereof at opposite points and permit pouring of the brewed coffee from the top of the lower receptacle while the sealing contact surfaces are in partial contact with each other, and a filtering means arranged in the line of said communication between the receptacles.

21. A coffee brewing device comprising a lower receptacle open at the top, an upper brewing receptacle, the receptacles having sealing contact surfaces disposed in sealing contact relation during the brewing process and at such time also having communication with each other, means for holding the receptacles in sealed relation during the brewing process, said receptacles being movable at will relative to each other against the holding action of said holding means upon completion of the brewing process to break the sealed contact engagement thereof at opposite points and permit pouring of the brewed coffee from the top of the lower receptacle while the sealing contact surfaces are in partial contact with each other and without removing said holding means from the device, and a filtering means arranged in the line of said communication between the receptacles.

22. A vacuum type coffee brewer comprising upper and lower receptacles, the lower receptacle having an upper pouring lip and inwardly offset annular downwardly tapered wall portion constituting a sealing area below said lip, said upper receptacle being insertable within said lower receptacle and having a bottom provided with a depending funnel and a shoulder outwardly convex in vertical section adjacent the lower end of the upper receptacle adapted to engage and frictionally seat within said sealing area of the lower receptacle to provide a relatively narrow annular seal therebetween, the upper portion of said upper receptacle above said seal being spaced from the surrounding pouring lip of the lower receptacle whereby said seal may be broken by tilting the upper receptacle laterally within said lower receptacle and fluid may be poured from the lower receptacle with the upper receptacle in tilted position therein.

23. A vacuum type coffee brewer comprising inner and outer receptacles, the outer receptacle having an upper pouring lip and inwardly offset annular downwardly tapered wall portion constituting a sealing area below said lip, said inner receptacle being insertable within said outer receptacle and having a bottom provided with a depending funnel and a shoulder outwardly convex in vertical section adjacent the lower end thereof adapted to engage and frictionally seat within said sealing area of the outer receptacle to provide a relatively narrow annular seal therebetween, the upper portion of said inner receptacle above said seal being spaced from the surrounding pouring lip of the outer receptacle whereby said seal may be broken by tilting the inner receptacle laterally within said outer receptacle and fluid may be poured from the outer receptacle with the inner receptacle in tilted position therein.

CONDICT M. NEVIUS.

CERTIFICATE OF CORRECTION.

Patent No. 2,129,587.  September 6, 1938.

CONDICT M. NEVIUS.

It is hereby certified that error appears in the printed specification of the above numbered patent requiring correction as follows: Page 5, first column, line 39, claim 14, for "annunlar" read annular; and line 47, for "ceptacle" read receptacle; same page and column, line 73, claim 15, for the word "tilted" read tiltable; and that the said Letters Patent should be read with this correction therein that the same may conform to the record of the case in the Patent Office.

Signed and sealed this 25th day of October, A. D. 1938.

Henry Van Arsdale (Seal)  Acting Commissioner of Patents.